United States Patent
Kim et al.

(10) Patent No.: US 12,427,505 B2
(45) Date of Patent: Sep. 30, 2025

(54) CATALYST FOR A DEHYDROGENATION REACTION, A MANUFACTURING METHOD THEREOF, AND A HYDROGEN PRODUCTION METHOD USING SAME

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Pyung Soon Kim, Suwon-si (KR); Jin Woo Choung, Suwon-si (KR); Yongwoo Kim, Gunpo-si (KR); Jihui Seo, Ulsan (KR); Jaeyong Lee, Seongnam-si (KR); Sungeun Moon, Seoul (KR); Changil Ahn, Seoul (KR); Suk Woo Nam, Seoul (KR); Hyuntae Sohn, Seoul (KR); Yongmin Kim, Seoul (KR); Hyangsoo Jeong, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 62 days.

(21) Appl. No.: 17/862,532

(22) Filed: Jul. 12, 2022

(65) Prior Publication Data
US 2023/0256419 A1    Aug. 17, 2023

(30) Foreign Application Priority Data

Feb. 15, 2022    (KR) .................. 10-2022-0019704

(51) Int. Cl.
*B01J 23/02*    (2006.01)
*B01J 21/04*    (2006.01)
(Continued)

(52) U.S. Cl.
CPC ............... *B01J 23/63* (2013.01); *B01J 21/04* (2013.01); *B01J 37/0205* (2013.01);
(Continued)

(58) Field of Classification Search
None
See application file for complete search history.

(56) References Cited

U.S. PATENT DOCUMENTS

2014/0200384 A1*  7/2014  Kauffman ................ B01J 37/08
                                                              502/213

FOREIGN PATENT DOCUMENTS

| CN | 102451677 A | * | 5/2012 |
| CN | 107899619 A | * | 4/2018 |
| CN | 113967474 A | * | 1/2022 |

OTHER PUBLICATIONS

Liu et al. (CN 113967474 A, Machine-generated English translation is attached (Year: 2022).*

(Continued)

*Primary Examiner* — Yun Qian
(74) *Attorney, Agent, or Firm* — Lempia Summerfield Katz LLC

(57) ABSTRACT

A catalyst for a dehydrogenation reaction includes a carrier including $Al_2O_3$ having a theta ($\theta$) phase, an active metal supported on the carrier and including a noble metal, and an auxiliary metal supported on the carrier and different from the active metal.

19 Claims, 9 Drawing Sheets

(51) Int. Cl.
  *B01J 23/63* (2006.01)
  *B01J 37/02* (2006.01)
  *B01J 37/08* (2006.01)
  *C01B 3/00* (2006.01)
  *C01F 7/08* (2022.01)

(52) U.S. Cl.
  CPC ......... *B01J 37/0207* (2013.01); *B01J 37/024* (2013.01); *B01J 37/088* (2013.01); *C01B 3/0015* (2013.01)

(56) References Cited

OTHER PUBLICATIONS

Li et al. CN 102451677, Machine-generated English translation (Year: 2012).*
CN 107899619 A, Machine-generated English translation (Year: 2018).*

\* cited by examiner

CATALYST FOR A DEHYDROGENATION REACTION, A MANUFACTURING METHOD THEREOF, AND A HYDROGEN PRODUCTION METHOD USING SAME

CROSS-REFERENCE TO RELATED APPLICATION

This application claims priority to and the benefit of Korean Patent Application No. 10-2022-0019704 filed in the Korean Intellectual Property Office on Feb. 15, 2022, the entire contents of which are incorporated herein by reference.

BACKGROUND

(a) Technical Field

The present disclosure relates to a catalyst for a dehydrogenation reaction that produces hydrogen by dehydrogenating a chemical hydride, for example, a liquid organic hydrogen carrier (LOHC), a manufacturing method thereof, and a hydrogen production method using same.

(b) Description of the Related Art

The statements in this section merely provide background information related to the present disclosure and may not constitute prior art.

Due to the depletion of fossil energy and environmental pollution problems, there is a great demand for renewable and alternative energy. Hydrogen is attracting attention as one of such alternative energies.

A fuel cell and a hydrogen combustion device use hydrogen as a reaction gas. In order to apply the fuel cell and the hydrogen combustion device to vehicles and various electronic products, a stable and continuous supply technology of hydrogen is required.

In order to supply hydrogen to a device that uses hydrogen, a method of receiving hydrogen whenever hydrogen is needed from a separately installed hydrogen supply source may be used. In this way, compressed hydrogen or liquid hydrogen may be used for hydrogen storage.

Alternatively, a method of generating hydrogen through a reaction of a corresponding material after mounting a material in which hydrogen is stored and generated on a device using hydrogen and supplying it to the device using hydrogen may be used. For this method, for example, a method of using a liquid organic hydrogen carrier (LOHC), a method of using adsorption and desorption (absorbents/carbon), a chemical method (chemical hydrogen storage), and the like have been proposed.

A noble metal catalyst is desired to generate hydrogen from a liquid organic hydrogen carrier. At this time, in order to minimize the amount of the noble metal catalyst and to minimize the volume of the system, a dehydrogenation performance should be excellent at high space velocity (LHSV, Liquid Hourly Space Velocity, LLOHC/Lcat/h).

However, a platinum (Pt) content of about 3 wt % is currently required to achieve a hydrogen conversion rate of about 50% at a high space velocity (LHSV of about 12). At a low space velocity (LHSV of about 2), when the platinum (Pt) content is 0.5 wt % or more, the hydrogen conversion rate is very good, about 90% or more. However, when the space velocity is increased, a catalyst with a low platinum (Pt) content does not increase the amount of produced hydrogen significantly.

On the other hand, in the case of a catalyst having a high noble metal content, the amount of produced hydrogen gradually increases as the space velocity increases. However, when the content of noble metals is increased, difficulties may arise in terms of commercialization.

SUMMARY

The present disclosure provides a catalyst for the dehydrogenation reaction that includes a low content of noble metals and has an excellent hydrogen conversion rate at high space velocity.

According to one embodiment of the present disclosure, a catalyst for a dehydrogenation reaction includes a carrier including $Al_2O_3$ having a theta ($\theta$) phase, an active metal supported on the carrier and having a noble metal, and an auxiliary metal supported on the carrier and different from the active metal.

The carrier may further include $Al_2O_3$ having a gamma ($\gamma$) phase.

The carrier may include $Al_2O_3$ having the theta ($\theta$) phase in an amount greater than or equal to about 90 wt % based on the total weight of $Al_2O_3$.

The carrier may further include $TiO_2$, $SiO_2$, $ZrO_2$, $SnO_2$, $Ta_2O_5$, $HfO_2$, $La_2O_3$, $V_2O_5$, $CeO_2$, $Fe_2O_3$, $Cr_2O_3$, $MoO_3$, $ZnO$, $MgO$, $WO_3$, or a combination thereof.

The active metal may include platinum (Pt), palladium (Pd), rhodium (Rh), ruthenium (Ru), iridium (Ir), osmium (Os), or a mixture thereof.

The auxiliary metal may include tin (Sn), zinc (Zn), manganese (Mn), rhenium (Re), yttrium (Y), magnesium (Mg), vanadium (V), cerium (Ce), lanthanium (La), samarium (Sm), gadolinium (Gd), sodium (Na), potassium (K), cesium (Cs), rubidium (Rb), nickel (Ni), cobalt (Co), iron (Fe), chromium (Cr), copper (Cu), or a mixture thereof.

The catalyst may include the active metal, and the auxiliary metal in an amount of about 0.1 wt % to about 21 wt % based on the total weight of the catalyst.

The catalyst may include the active metal in an amount of about 0.1 wt % to about 5 wt % based on the total weight of the catalyst.

The catalyst may include the auxiliary metal in an amount of about 1 wt % to about 20 wt % based on the total weight of the catalyst.

The catalyst may include platinum (Pt) as an active metal, and yttrium (Y) as an auxiliary metal.

According to another embodiment of the present disclosure, a method for manufacturing a catalyst for a dehydrogenation reaction includes heat-treating $Al_2O_3$ having a gamma ($\gamma$) phase to prepare $Al_2O_3$ having a theta ($\theta$) phase. The method further includes supporting an active metal including a noble metal and an auxiliary metal different from the active metal on the carrier.

The heat-treating of $Al_2O_3$, having the gamma ($\gamma$) phase, may be performed at a temperature increase rate of about 1° C./min to about 10° C./min, at about 500° C. or higher and less than about 1200° C., for about 1 to 5 hours.

The supporting may be accomplished by mixing a solution including a precursor of the auxiliary metal with a carrier, followed by drying and sintering the mixture to prepare a carrier on which the auxiliary metal is supported. The supporting may further be accomplished by mixing a solution including a precursor of the active metal with the carrier on which the auxiliary metal is supported, followed by sintering the mixture to support the active metal on the carrier on which the auxiliary metal is supported.

The supporting may be accomplished by mixing a solution including a precursor of the auxiliary metal with a carrier, followed by drying the mixture to manufacture a carrier treated with an auxiliary metal. The supporting may be further accomplished by mixing a solution including a precursor of the active metal with a carrier treated with an auxiliary metal, followed by sintering the mixture to support the active metal and the auxiliary metal on the carrier.

The supporting may be accomplished by mixing a solution including a precursor of the active metal and a solution including a precursor of an auxiliary metal with a carrier, followed by sintering the mixture to support the active metal and the auxiliary metal on the carrier.

The solution including the precursor of the active metal or the solution including the precursor of the auxiliary metal may include about 14 volume % to about 100 volume % of water and about 0 volume % to about 86 volume % of ethanol, based on the total volume of the solvent.

The solution including the precursor of the active metal or the solution including the precursor of the auxiliary metal and the carrier may be mixed at about 20° C. to about 60° C. for about 2 hours or more.

Hydrochloric acid (HCl) may be further added to the solution including the precursor of the active metal.

The hydrochloric acid may be included in an amount of about 1 wt % to about 10 wt % based on the total weight of the solvent of the solution including the precursor of the active metal.

The precursor of the active metal may include a nitrate, a sulfate, an acetate, a chloride, an oxide, a hydroxide, or a mixture thereof of the active metal.

The precursor of the auxiliary metal may include a nitrate, a sulfate, an acetate, a chloride, an oxide, a hydroxide, or a mixture thereof of the auxiliary metal.

The sintering may be performed at a temperature increase rate of about 1° C./min to about 10° C./min, at about 400° C. to about 500° C. for about 3 to 5 hours.

When supported, the carrier may include $Al_2O_3$ having a theta (θ) phase.

When sintering to prepare a carrier on which an auxiliary metal is supported, heat-treating of $Al_2O_3$ having a gamma (γ) phase may also be performed.

The sintering may be performed at greater than or equal to about 400° C. and less than about 1100° C. for about 3 to 5 hours.

In another embodiment of the present disclosure, a hydrogen production method may include producing hydrogen by dehydrogenating a chemical hydride in the presence of the aforementioned catalyst for a dehydrogenation reaction.

The chemical hydride may include methylcyclohexane, cyclohexane, perhydro-benzyltoluene, perhydro-dibenzyltoluene, bicyclohexyl, bicyclohexyl-dicyclohexyl-dicyclohexyl methane, decalin, 4-amino-piperidine, 2-methylperhydroindole, N-methylperhydroindole, dodecahydro-N-ethylcarbazole, methylpiperidine, dimethylpiperidine, methylquinoline, bipiperidine, phenylpyridine, or a mixture thereof.

The catalyst for a dehydrogenation reaction, according to one aspect of the present disclosure, has excellent hydrogen conversion rate at high space velocity while including a low content of noble metals. Accordingly, the amount of the noble metal catalyst used and the volume of the system may be reduced.

BRIEF DESCRIPTION OF THE DRAWINGS

In order for the disclosure to be well understood, various forms are described thereof, given by way of example, and reference should be made to the accompanying drawings, in which.

Figure 1:
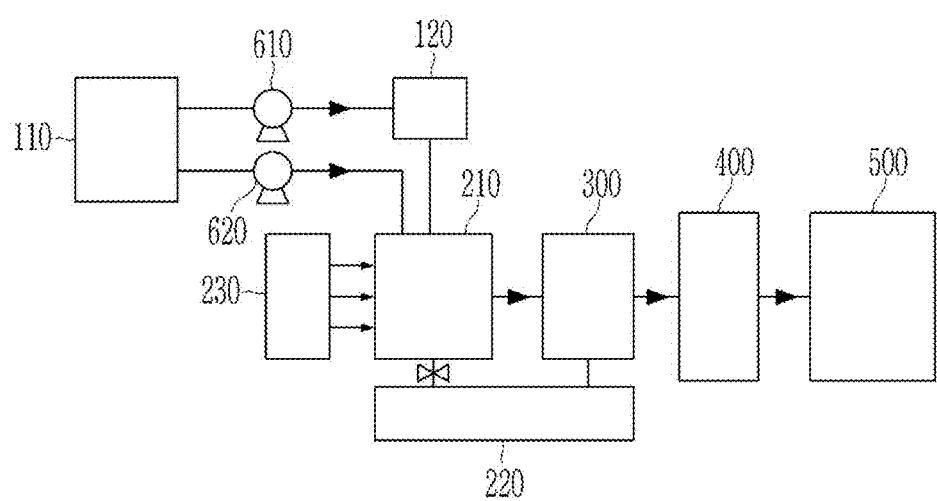
FIG. 1 is a schematic view illustrating a dehydrogenation reaction system according to a hydrogen production method according to one aspect.

The drawings described herein are for illustration purposes only and are not intended to limit the scope of the present disclosure in any way.

DETAILED DESCRIPTION

The advantages, features, and aspects described hereinafter become apparent from the following description of the embodiments, which is set forth hereinafter. However, the present disclosure should not be limited to embodiments that are described herein. Although not specifically defined, all of the terms, including the technical and scientific terms used herein, have meanings understood by those having ordinary skill in the art. The terms have specific meanings coinciding with related technical references, the present specification, and lexical meanings. In other words, the terms are not to be construed as having idealized or formal meanings.

Throughout the specification and claims which follow, unless explicitly described to the contrary, the word "comprise/include" or variations such as "comprises/includes" or "comprising/including" should be understood to imply the inclusion of stated elements but not the exclusion of any other elements. The terms of a singular form may include plural forms unless referred to the contrary.

When a component, device, element, or the like of the present disclosure is described as having a purpose or performing an operation, function, or the like, the component, device, or element should be considered herein as being "configured to" meet that purpose or to perform that operation or function.

The catalyst for a dehydrogenation reaction, according to one aspect, includes a carrier, and an active metal and an auxiliary metal supported on the carrier.

The carrier includes $Al_2O_3$. The $Al_2O_3$ may include $\theta$-$Al_2O_3$, $\gamma$-$Al_2O_3$, $\alpha$-$Al_2O_3$, $\eta$-$Al_2O_3$, $\delta$-$Al_2O_3$, $\kappa$-$Al_2O_3$, or a mixture thereof, and for example, $\theta$-$Al_2O_3$ alone, or a mixture of $\theta$-$Al_2O_3$ and $\gamma$-$Al_2O_3$. When the carrier includes $Al_2O_3$, the amount of produced hydrogen can be increased even when the space velocity is increased during the dehydrogenation reaction of the liquid organic hydrogen carrier (LOHC). In this case, the carrier may include $\theta$-$Al_2O_3$ in an amount greater than or equal to about 90 wt % based on the total weight of $Al_2O_3$.

The carrier may have a binary pore size distribution including both mesopores having an average pore size of about 5 nm to about 100 nm and macropores having an average pore size of about 0.1 μm to about 20 μm. Due to this dual pore size distribution characteristic, the catalyst may have improved activity and ease of regeneration in the dehydrogenation reaction upon reaction. If the size of the pores of the carrier is less than about 5 nm, a mass transfer rate may decrease. Further, if the pores of the carrier exceed about 20 μm, the strength of the carrier may decrease. In other words, when the pore size is about 10 nm to about 1000 nm, it has transition diffusion, and when the pore size is 1000 nm or more, it has bulk diffusion. In the case of having macropores greater than or equal to about 1 μm, the mass transfer rate may be 20 times higher than that of the case of having pores of 10 nm.

The carrier may have a specific surface area of about 55 $m^2/g$ to about 140 $m^2/g$. If the specific surface area of the carrier is less than about 55 $m^2/g$, dispersion degrees of the active metal and the auxiliary metal may be lowered. Further, if it exceeds about 140 $m^2/g$, a gamma ($\gamma$) crystallinity of $Al_2O_3$ is maintained high, thereby increasing side reactivity.

The carrier may have a strength of about 20 N to about 50 N. By increasing the strength of the carrier, the catalyst may be prevented from being crushed even during regeneration or circulation of the catalyst. If the strength of the carrier is less than about 20 N, the carrier may be easily broken so that it may be difficult to apply to a continuous reaction system. Further, if the strength of the carrier is less than about 20 N, thermal cracking may occur during the regeneration process. In addition, in the dehydrogenation reaction, friction or impact is applied during transport under the condition that the catalyst is circulated. Further, when a carrier is weak to impact, the flow of the product is interrupted and the pressure in the reactor is increased to lower the conversion rate of the catalyst. Therefore, a high strength may give a great advantage to the operation of the process.

In addition to $Al_2O_3$, the carrier may further include $TiO_2$, $SiO_2$, $ZrO_2$, $SnO_2$, $Ta_2O_5$, $HfO_2$, $La_2O_3$, $V_2O_5$, $CeO_2$, $Fe_2O_3$, $Cr_2O_3$, $MoO_3$, $ZnO$, $MgO$, $WO_3$, or a combination thereof.

The active metal is a component supported on a carrier. The active metal has an activity that contributes to the improvement of the amount of hydrogen produced during the dehydrogenation reaction of a chemical hydride. For example, the active metal may include platinum (Pt), palladium (Pd), rhodium (Rh), ruthenium (Ru), iridium (Ir), osmium (Os), or a mixture thereof.

The auxiliary metal may include tin (Sn), zinc (Zn), manganese (Mn), rhenium (Re), yttrium (Y), magnesium (Mg), vanadium (V), cerium (Ce), lanthanum (La), samarium (Sm), gadolinium (Gd), sodium (Na), potassium (K), cesium (Cs), rubidium (Rb), nickel (Ni), cobalt (Co), iron (Fe), chromium (Cr), copper (Cu), or a mixture thereof. For example, yttrium (Y) may change the state and dispersion of the active metal, and even when the content of the active metal is decreased, the amount of produced hydrogen may be greatly increased.

The catalyst may include the active metal and the auxiliary metal in an amount of about 0.1 wt % to about 21 wt % based on the total weight of the catalyst. For example, the active metal may be included in an amount of about 0.1 wt % to about 5 wt % based on the total weight of the catalyst. Further, the auxiliary metal may be included in an amount of about 1 wt % to about 20 wt % based on the total weight of the catalyst.

When the content of the active metal is less than about 0.1 wt % based on the total weight of the catalyst, overall activity may be lowered even though the activity per catalyst unit active site is increased. Further, when the content of the active metal exceeds about 5 wt %, activity of the catalyst may be lowered according to the lowering of the dispersion of the active metal. When the content of the auxiliary metal is less than about 1 wt % based on the total weight of the catalyst, an effect of adding the auxiliary metal may be insignificant. Further, when the content of the auxiliary metal exceeds about 20 wt %, a surface area of the catalyst may decrease because the auxiliary metal may block pores and active sites of the catalyst, thereby reducing the activity of the catalyst.

The method for manufacturing a catalyst for dehydrogenation according to another aspect includes preparing $Al_2O_3$ having a theta ($\theta$) phase, and supporting an active metal including a noble metal and an auxiliary metal different from the active metal on the carrier.

The carrier may include $Al_2O_3$ having a theta ($\theta$) phase. The $Al_2O_3$ having the theta ($\theta$) phase may be prepared by heat-treating $Al_2O_3$ having a gamma ($\gamma$) phase.

The heat-treating of the $Al_2O_3$ having the gamma ($\gamma$) phase may also be performed at a temperature increase rate of about 1° C./min to about 10° C./min, greater than or equal to about 500° C. and less than about 1200° C. for about 1 to 5 hours. Accordingly, the carrier may include $\theta$-$Al_2O_3$ in an amount greater than or equal to about 90 wt % based on the total weight of $Al_2O_3$.

When the $Al_2O_3$ having the gamma ($\gamma$) phase is modified by sintering at a high temperature of greater than or equal to about 500° C. and less than about 1200° C., a $\theta$-type crystal structure $Al_2O_3$, with a small surface area but enlarged micropores, may be manufactured.

The $\gamma$-$Al_2O_3$ may have large side reactivity due to acid sites of alumina itself and cause changes in structural properties such as changes in alumina crystallinity and a decrease in a specific surface area during the reaction. The $\alpha$-$Al_2O_3$ may lower the dispersibility of the active metal and reduce the total active area of the active metal due to the low specific surface area and thus exhibit low catalyst activity.

When the $\theta$-$Al_2O_3$ is used as a carrier for a dehydrogenation reaction and particularly, as a carrier for a liquid organic hydrogen carrier dehydrogenation reaction, mass transfer restrictions may be inhibited under a condition of increasing injection velocity, i.e., space velocity of the reactants, and even molecules with large molecular sizes may smoothly transfer mass inside pores. However, since the pores may be enlarged, but the surface area is reduced through a heat treatment at a high temperature, dispersibility of the active metal may be lower than that of $\gamma$-$Al_2O_3$, but activity thereof as a dehydrogenation reaction catalyst may rather increase.

Optionally, after heat treatment, $Al_2O_3$ may be dried to remove any moisture. The $Al_2O_3$ may be dried at about 80° C. to about 120° C. for about 6 to 24 hours. When the drying is performed at a temperature of less than about 80° C., moisture may remain. Further, when the drying is performed at a temperature greater than about 120° C., residues may be deposited due to the transformation of residual impurities. When the drying is performed for less than about 6 hours, moisture may remain. Furthermore, when the drying is performed for more than 24 hours, the residue may be deposited due to the transformation of the remaining impurities.

As an example, the supporting may use a sequential impregnation method or a co-impregnation method.

The supporting by the sequential impregnation method may be accomplished by first preparing a carrier on which the auxiliary metal is supported, and then supporting the active metal on the carrier on which the auxiliary metal is supported.

In the preparation of the carrier on which the auxiliary metal is supported, a solution including a precursor of the auxiliary metal is mixed with the carrier, and it is then dried and sintered to prepare the carrier on which the auxiliary metal is supported.

The precursor of the auxiliary metal may include a nitrate, a sulfate, an acetate, a chloride, an oxide, a hydroxide, or a mixture thereof of the auxiliary metal.

The solution including the precursor of the auxiliary metal may be prepared by dissolving the precursor of the auxiliary metal in a solvent. The solvent may include water, alcohol, or a mixture thereof. For example, the solvent may include about 14 volume % to about 100 volume % of water, and about 0 volume % to about 86 volume % of ethanol, based on the total volume of the solvent. When the solvent includes a mixture of water and ethanol, the solvent may be evaporated at a lower temperature, thereby reducing the impregnation time. Further, when an organic solvent having a relatively low surface tension is used to increase the wettability of the surface of the carrier, and then a precursor solution dissolved in water is added, a catalyst having a high degree of dispersibility may be synthesized by sequentially replacing the organic solvent, having a weak interaction between the surface of the carrier and the metal precursor, by an aqueous phase precursor solution.

The solution including the precursor of the auxiliary metal and the carrier may be mixed at about 20° C. to about 60° C. for about 2 hours or more.

For example, the mixing may be accomplished by: initially stirring in a rotary evaporator at room temperature (about 25° C.) and low vacuum (about −0.08 MPa or less), stirring for 2 to 3 hours, vaporizing the solvent at about 25° C. to about 50° C. in a high vacuum (about −0.09 MPa or less) for about 30 minutes to about 1 hour in the rotary evaporator, and drying the solvent at 100° C. or more in a forced convection oven for 12 hours or more.

The sintering may be performed at a temperature increase rate of about 1° C./min to about 10° C./min, at about 400° C. to about 1100° C. for 3 to 5 hours.

When the sintering temperature is less than about 400° C. impurities and ligands included in the metal precursor may not be removed, and the crystallinity of the metal oxide included in the catalyst may decrease. Further, when it exceeds about 1100° C., aggregation of the added metal oxide may occur. When the sintering time is less than 3 hours, impurities and ligands included in the metal precursor may not be removed, and the crystallinity of the metal oxide included in the catalyst may decrease. Further, when it exceeds 5 hours, aggregation of the added metal oxide phenomenon may occur.

Alternatively, when sintering to prepare a carrier on which an auxiliary metal is supported, heat-treating of $Al_2O_3$ having a gamma (γ) phase may also be performed. At this time, the sintering may be performed at greater than or equal to about 500° C. and less than about 1200° C. for about 1 to 5 hours.

Optionally, the carrier on which the auxiliary metal is supported after sintering may be dried. The carrier on which the auxiliary metal is supported may be dried at about 80° C. to about 120° C. for about 6 to 24 hours. When the drying is performed at a temperature of less than about 80° C., moisture may remain. In addition, when the drying is performed at a temperature greater than 120° C., residue may be deposited due to the transformation of residual impurities. When the drying is performed for less than about 6 hours, moisture may remain, and when the drying is performed for greater than about 24 hours, the residue may be deposited due to the transformation of the remaining impurities.

The supporting of the active metal may be accomplished by mixing the solution including the precursor of the active metal with the carrier on which the auxiliary metal is supported, followed by sintering the mixture.

The precursor of the active metal may include a nitrate, a sulfate, an acetate, a chloride, an oxide, a hydroxide, or a mixture thereof of the auxiliary metal.

The solution containing the precursor of the active metal may be prepared by dissolving the precursor of the active metal in a solvent. The solvent may include water, alcohol, or a mixture thereof. For example, the solvent may include about 14 volume % to about 100 volume % of water, and about 0 volume % to about 86 volume % of ethanol, based on the total volume of the solvent. When the solvent includes a mixture of water and ethanol, the solvent may be evaporated at a lower temperature, thereby reducing the impregnation time. Further, when an organic solvent having a relatively low surface tension is used to increase the wettability of the surface of the carrier, and then a precursor solution dissolved in water is added, a catalyst having a high degree of dispersibility may be synthesized by sequentially replacing the organic solvent having a weak interaction between the surface of the carrier and the metal precursor, by an aqueous phase precursor solution.

Optionally, hydrochloric acid (HCl) may be further added to the solution including the precursor of the active metal. When hydrochloric acid is added, dispersibility may be increased by allowing the active metal to penetrate well into the interior of $\theta$-$Al_2O_3$.

The hydrochloric acid may be included in an amount of about 1 wt % to about 10 wt % based on the total weight of the solvent of the solution including the precursor of the active metal. When the content of hydrochloric acid is less than about 1 wt % based on the total weight of the solvent, the active metal may permeate into the carrier, and dispersibility of the active metal may decrease. Further, when it exceeds about 10 wt %, a large amount of the active metal may not be present on the surface of the carrier.

The solution including the precursor of the active metal and the carrier on which the auxiliary metal is supported may be mixed at about 20° C. to about 60° C. for about 2 hours or more.

For example, the mixing may be accomplished by: initially stirring in a rotary evaporator at room temperature (about 25° C. or less) and low vacuum (about −0.08 MPa or less), stirring for 2 to 3 hours, vaporizing the solvent at about 25° C. to about 50° C. in a high vacuum (about −0.09 MPa or less) for about 30 minutes to about 1 hour in the rotary evaporator, and drying the solvent at 100° C. or more in a forced convection oven for 12 hours or more.

The sintering may be performed at a temperature increase rate of about 1° C./min to about 10° C./min, at about 400° C. to about 500° C. for about 3 to 5 hours.

When the sintering temperature is less than about 400° C., impurities and ligands included in the metal precursor may not be removed, and the crystallinity of the metal oxide included in the catalyst may decrease. Further, when it exceeds about 500° C., aggregation of the added metal oxide may occur. When the sintering time is less than about 3 hours, impurities and ligands included in the metal precursor may not be removed, and the crystallinity of the metal oxide included in the catalyst may decrease. Furthermore, when it exceeds about 5 hours, aggregation of the added metal oxide may occur.

In another embodiment, the carrier on which the active metal is supported after sintering may be dried. The carrier on which the active metal is supported may be dried at about 80° C. to about 120° C. for about 6 to 24 hours. When the drying is performed at a temperature of less than about 80° C., moisture and impurities may remain. When the drying is performed at a temperature greater than about 120° C. residue may be deposited due to the transformation of residual impurities. When the drying is performed for less than about 5 hours, moisture may remain, and when the drying is performed for greater than about 24 hours, the residue may be deposited due to the transformation of the remaining impurities.

The supporting by the co-impregnation method may be accomplished by sequentially or simultaneously supporting the active metal and the auxiliary metal on the carrier.

For example, the supporting by the co-impregnation method may include: mixing a solution including a precursor of the auxiliary metal with a carrier, drying the mixture to manufacture a carrier treated with an auxiliary metal, mixing a solution including a precursor of the active metal with a carrier treated with the auxiliary metal, and sintering the mixture to support the active metal and the auxiliary metal on the carrier.

Alternatively, the supporting by the co-impregnation may be accomplished by mixing the solution including the precursor of the active metal and the solution including the precursor of the auxiliary metal with the carrier, followed by sintering the mixture.

The solution including the precursor of the active metal and the solution including the precursor of the auxiliary metal and the carrier may be mixed at about 20° C. to about 60° C. for about 2 hours or more.

For example, the mixing may be accomplished by: initially stirring in a rotary evaporator at room temperature (about 25° C. or less) and low vacuum (about −0.08 MPa or less), stirring for 2 to 3 hours, vaporizing the solvent at about 25° C. to about 50° C. in a high vacuum (about −0.09 MPa or less) for about 30 minutes to about 1 hour in the rotary evaporator, and drying the solvent at 100° C. or more in a forced convection oven for 12 hours or more.

The sintering may be performed at a temperature increase rate of about 1° C./min to about 10° C./min, at about 400° C. to about 500° C. for about 3 to 5 hours.

In another embodiment, the carrier on which the active metal and the auxiliary metal are supported after sintering may be dried. The carrier on which the active metal and the auxiliary metal are supported may be dried at about 80° C. to about 120° C. for about 6 to 24 hours.

A hydrogen production method, according to another aspect, includes dehydrogenating a chemical hydride in the presence of the catalyst for the dehydrogenation reaction to produce hydrogen.

FIG. 1 is a schematic view illustrating a dehydrogenation reaction system according to a hydrogen production method. Hereinafter, a hydrogen production method is described in detail with reference to FIG. 1.

Referring to FIG. 1, the dehydrogenation reaction system includes a reactant tank 110, and a dehydrogenation reactor 210.

The reactant tank 110 includes a chemical hydride.

The chemical hydride may include, for example, a liquid organic hydrogen carrier (LOHC).

The liquid organic hydrogen carrier may be a monocyclic hydrogenated aromatic compound, a bicyclic hydrogenated aromatic compound, or a tricyclic hydrogenated aromatic compound and may include, for example, methylcyclohexane (MCH), cyclohexane, perhydro-benzyltoluene, perhydro-dibenzyltoluene, bicyclohexyl, bicyclohexyl-dicyclohexyl methane, decalin, 4-amino-piperidine, 2-methylperhydroindole, N-methylperhydro N-methylperhydrolindole, dodecahydro-N-ethylcarbazole, methylpiperidine, dimethylpiperidine, methylquinoline, bipiperidine, phenylpyridine, or a mixture thereof Specifically, the liquid organic hydrogen carrier may include: decalin (decahydronaphthalene), tetralin (1,2,3,4-tetrahydronaphthalene), cyclohexane, dicyclohexyl, methylcyclohexane (MCH), N-ethylcarbazole (NEC), perhydro-N-ethylcarbazole, dibenzyltoluene (DBT), a mixture of biphenyl and diphenyl methane (BPDM), or a mixture thereof.

The reactant tank 110 supplies a liquid organic hydrogen carrier to the dehydrogenation reactor 210. Pumps 610 and 620 for supplying a liquid organic hydrogen carrier to the dehydrogenation reactor 210 may be included between the reactant tank 110 and the dehydrogenation reactor 210.

When the aqueous phase reaction is carried out in the dehydrogenation reactor 210, the reactant may be injected into the dehydrogenation reactor 210 in a liquid phase through an injector. After being preheated, the reactants may be injected into the dehydrogenation reactor 210.

Alternatively, when the gas phase reaction proceeds in the dehydrogenation reactor 210, the liquid organic hydrogen carrier may be vaporized through a vaporizer 120, and then supplied to the dehydrogenation reactor 210.

In addition, in the dehydrogenation reactor 210, the gas phase reaction and the aqueous phase reaction may proceed, respectively, and the system may be separately manufactured.

The dehydrogenation reactor 210 produces hydrogen by the dehydrogenation reaction of the liquid organic hydrogen carrier. The dehydrogenation reaction may be performed in the presence of a catalyst. Further, the dehydrogenation reactor 210 may include the aforementioned catalyst for the dehydrogenation reaction therein.

The dehydrogenation reaction system may further include a heat source 230 for supplying heat to the dehydrogenation reactor 210 as needed.

A type of the heat source 230 is not particularly limited but may use, for example, a hydrogen burner generating heat by combusting a portion of the generated hydrogen, or an electric heater composed of a heating wire, and the like may be used.

In addition, the dehydrogenation reaction system may further include a heat exchange device (not shown) for heat recovery, if necessary.

When a dehydrogenation reaction in the dehydrogenation reactor 210 is an aqueous phase reaction, the dehydrogenation reaction system may further include a product tank 220 for separating hydrogen and dehydrogenated chemical hydride from products generated in the dehydrogenation reactor 210.

Alternatively, when the dehydrogenation reaction in the dehydrogenation reactor 210 is a gas phase reaction, the dehydrogenation reaction system may further include a hydrogen separator 300 for separating hydrogen and dehydrogenated hydrides from the products generated in the dehydrogenation reactor 210.

For example, chemical hydrides reacting in a gaseous state, such as MCH, BPDM, and the like, pass through the hydrogen separator 300 to separate the generated hydrogen and the dehydrogenated chemical hydride. Further, LOHC reacting in a liquid state, such as NEC, DBT, and the like, may not pass through the hydrogen separator 300.

The hydrogen generated from the dehydrogenation reactor 210 may be transported to a buffer tank 400. The buffer tank 400 receives and stores a certain amount of hydrogen gas.

A fuel cell stack 500 is disposed at the downstream of the buffer tank 400 and supplied with the hydrogen gas from the buffer tank 400. For example, the fuel cell stack 500 may receive the hydrogen gas through an intake port such as a valve and the like from the buffer tank 400.

The fuel cell stack 500 reacts with the supplied hydrogen and with oxygen to generate water and, at the same time, to generate electrical energy. The water generated from the fuel cell stack 500 is discharged through an exhaust means, such as a valve and the like.

The fuel cell stack 500 may be any device that converts the hydrogen gas into usable electrical energy. For example, it may be a proton exchange membrane fuel cell (PEMFC), an alkaline fuel cell (AFC), a phosphoric acid fuel cell (PAFC), a molten carbonate salt fuel cell (MCFC), or a solid oxide fuel cell (SOFC), etc., but the present disclosure is not limited thereto.

For example, the fuel cell stack 500 may pass the generated electrical energy through a power converter such as a DC converter, an inverter, or a charge controller. The power converter may output a portion of the electrical energy to an electrical load through a load interconnect, and the other portion of the electrical energy may be sent back to the energy storage through a recharging interconnect. Another portion of the electrical energy may be used to supply power to a control unit.

The dehydrogenation reaction system, if necessary, may further include an additional pump, a filter (not illustrated), or both of them. The dehydrogenation reaction system may further include a control unit for controlling the operation of the dehydrogenation reaction system.

The pumps 610 and 620, as aforementioned, may be used to supply the liquid organic hydrogen carrier of the reactant tank 110 to the dehydrogenation reactor 210. In addition, the additional pump may be further included to supply the hydrogen gas generated in the dehydrogenation reactor 210 to the buffer tank 400 or the fuel cell stack 500.

The filter may filter the generated hydrogen gas and thus substantially remove undesired particles (unwanted particles) not included in the hydrogen gas. The filter may be disposed between the dehydrogenation reactor 210, the hydrogen separator 300, the buffer tank 400, or the fuel cell stack 500. Particularly, the filter may be disposed of between the buffer tank 400 and the fuel cell stack 500.

The control unit may be connected to a plurality of pumps, regulators, needle valves, check valves, ball valves, and multiway valves with a control line to control the operation.

Hereinafter, specific examples of the disclosure are presented. However, the examples described below are only for specifically illustrating or explaining the disclosure, and the scope of the inventive concept is not limited thereto.

Preparation Example: Preparation of Catalyst for a Dehydrogenation Reaction

Example 1-1: Pt(0.5)/Y(3)-θ-Al$_2$O$_3$, Sequential Impregnation, Pt-Chloride+HCl An yttrium (Y) precursor is mixed with a solvent (water+ethanol, a mixing ratio: 16/84 (v/v)), to prepare an yttrium (Y) precursor solution (3 wt %).

The yttrium precursor solution is mixed with dried γ-Al$_2$O$_3$ beads. The yttrium precursor solution is then stirred at room temperature under low vacuum (−0.08 MPa) for about 2 to 3 hours in a rotary evaporator and heated up to 25° C. to 50° C. to gasify the solvent under high vacuum (−0.09 MPa or less) for 30 minutes to 1 hour.

In the rotary evaporator, the solvent-dried yttrium-treated carrier is dried for 12 hours or more in a 100° C. oven.

The yttrium-treated carrier is sintered and heat-treated at a temperature increase rate of 5° C./min under a static air atmosphere and at 1020° C. for 5 hours, preparing a Y(3)-θ-Al$_2$O$_3$ carrier on which yttrium is supported.

The yttrium-supported carrier is dried at 100° C. to remove any moisture.

A platinum (Pt) precursor solution (0.5 wt %) is prepared by mixing platinum chloride with a solvent (water+ethanol, a mixing ratio: 16/84 (v/v)).

To the platinum precursor solution, 5 wt % of hydrochloric acid based on a weight of the solvent is added.

The platinum precursor solution is mixed with the carrier on which the dried yttrium is supported. The platinum precursor solution is then stirred in a rotary evaporator at room temperature under low vacuum (−0.08 MPa) for 2 to 3 hours, and heated to 25° C. to 50° C. to gasify the solvent under high vacuum (−0.09 MPa or less) for 30 minutes to 1 hour.

In the rotary evaporator, a carrier on which platinum-treated yttrium is supported after drying the solvent, is dried for 12 hours in a 100° C. oven.

The carrier on which platinum-treated yttrium is supported, is sintered at 450° C. for 3 hours at a temperature increase rate of 1° C./min.

The carrier on which yttrium and platinum are supported is dried at 100° C. to remove any moisture, when preparing a catalyst.

Example 1-2: Pt(0.5)/Y(1.5)-θ-Al$_2$O$_3$, Sequential Impregnation, Pt-Chloride+HCl A catalyst is prepared in the same manner as in Example 1-1, except that the supporting amount of yttrium is adjusted to 1.5 wt %.

Example 1-3: Pt(0.5)/Y(10)-θ-Al$_2$O$_3$, Sequential Impregnation, Pt-Chloride+HCl A catalyst is prepared in the same manner as in Example 1-1, except that the supporting amount of yttrium is adjusted to 10 wt %.

Example 2-1: Pt(0.5)Y(3)/θ-Al$_2$O$_3$, Co-Impregnation, Pt-Chloride+HCl

When preparing a carrier, γ-Al$_2$O$_3$ beads are heat-treated at a temperature increase rate of 5° C./min under a static air atmosphere and at 1020° C. for 5 minutes to prepare θ-Al$_2$O$_3$. The γ-Al$_2$O$_3$ beads are then dried at 100° C. to remove any moisture.

When preparing an yttrium (Y) precursor solution (3 wt %), an yttrium (Y) precursor is mixed with a solvent (water+ethanol, a mixing ratio: 16/84 (v/v)).

The yttrium precursor solution is mixed with the dried carrier and then stirred in a rotary evaporator at room temperature under low vacuum (−0.08 MPa) for 2 to 3 hours. The yttrium precursor solution is then heated to 25° C. to 50° C. under high vacuum (−0.09 MPa or less) for 30 minutes to 1 hour to gasify the solvent. After drying the solvent in the rotary evaporator, an yttrium-treated carrier is dried in a 100° C. oven for 12 hours.

A platinum (Pt) precursor solution (0.5 wt %) is prepared by mixing platinum chloride with a solvent (water+ethanol, a mixing ratio: 16/84 (v/v)). Herein, 5 wt % of hydrochloric acid based on a weight of the solvent is added to the platinum precursor solution.

The platinum precursor solution is mixed with the dried yttrium-treated carrier and then stirred at room temperature under low vacuum (−0.08 MPa) for 2 to 3 hours in the rotary evaporator. The platinum precursor solution is then heated to 25° C. to 50° C. under high vacuum (−0.09 MPa or less) for 30 minutes to 1 hour to gasify the solvent. In the rotary evaporator, the yttrium and platinum-treated carrier, after drying the solvent, is dried in the 100° C. oven for 12 hours.

The yttrium and platinum-treated carrier is sintered at 450° C. for 3 hours at a temperature increase rate of 1° C./min.

The carrier on which yttrium and platinum are supported is dried at 100° C. to remove any moisture, when preparing a catalyst.

Comparative Example 1-1: Pt(0.5)/γ-Al$_2$O$_3$, Pt-Chloride+HCl

Platinum chloride is mixed with a solvent (water+ethanol, a mixing ratio: 16/84 (v/v)), preparing a platinum (Pt) precursor solution (0.5 wt %). At this time, 5 wt % of hydrochloric acid based on a weight of the solvent is added to the platinum precursor solution.

The platinum precursor solution is mixed with the dried γ-Al$_2$O$_3$ bead carrier and then stirred in a rotary evaporator at room temperature under low vacuum (−0.08 MPa) for 2 to 3 hours. The platinum precursor solution is then heated at 25° C. to 50° C. to gasify the solvent under high vacuum (−0.09 MPa or less) for 30 minutes to 1 hour.

The platinum-treated carrier obtained by drying the solvent in a rotary evaporator is dried in the 100° C. oven for 12 hours or more.

The platinum-treated carrier is sintered at 450° C. for 3 hours at a temperature increase rate of 1° C./min.

The carrier on which platinum is supported is dried at 100° C. to remove any moisture, when preparing a catalyst.

Comparative Example 1-2: Pt(0.5)/γ-Al$_2$O$_3$, Pt-Chloride

A catalyst is prepared in the same manner as in Comparative Example 1-1, except that hydrochloric acid is not added to the platinum precursor solution.

Comparative Example 1-3: Pt(0.5)/γ-Al$_2$O$_3$, Pt-Nitrate

A catalyst is prepared in the same manner as in Comparative Example 1-2, except that platinum nitrate is used as a platinum precursor.

Comparative Example 1-4: Pt(3.0)/γ-Al$_2$O$_3$, Pt-Chloride+HCl

A catalyst is prepared in the same manner as in Comparative Example 1-1, except that the supporting amount of platinum is adjusted to 3 wt %.

Comparative Example 2-1: Pt(0.5)Y(3)/γ-Al$_2$O$_3$, Pt-Chloride+HCl

A catalyst is prepared in the same manner as in Example 2-1, except that θ-Al$_2$O$_3$ is prepared by heat-treating γ-Al$_2$O$_3$.

Comparative Example 3-1: Pt(0.5)/θ-Al$_2$O$_3$, Pt-Chloride+HCl

A carrier is prepared by heat-treating alumina beads at a temperature increase rate of 5° C./min under a static air and at 1020° C. for 5 hours to prepare θ-Al$_2$O$_3$ and then drying the θ-Al$_2$O$_3$ at 100° C. to remove any moisture.

A platinum (Pt) precursor solution (0.5 wt %) is prepared by mixing platinum chloride with a solvent (water+ethanol, a mixing ratio: 16/84 (v/v)). Herein, 5 wt % of hydrochloric acid based on a weight of the solvent is added to the platinum precursor solution.

The platinum precursor solution is mixed with the dried γ-Al$_2$O$_3$ carrier and then stirred in a rotary evaporator at room temperature under low vacuum (−0.08 MPa) for 2 to 3 hours. The platinum precursor solution is then heat-treated at 25° C. to 50° C. under high vacuum (−0.09 MPa or less) for 30 minutes to 1 hour.

The platinum-treated carrier obtained by drying the solvent in the rotary evaporator is dried in an oven at 100° C. for 12 hours or more.

The platinum-treated carrier is sintered at 450° C. for 3 hours at a temperature increase rate of 1° C./min.

The carrier on which platinum is supported is dried at 100° C. to remove any moisture, when preparing a catalyst.

Comparative Example 3-2: Pt(0.5)/θ-Al$_2$O$_3$, Pt-Chloride

A catalyst is prepared in the same manner as in Comparative Example 3-1, except that hydrochloric acid is not added to the platinum precursor solution.

Reference Example 1-1: α-Al$_2$O$_3$

A carrier is prepared by heat-treating alumina beads at a temperature increase rate of 5° C./min under a static air atmosphere and at 1200° C. for 5 hours to prepare α-Al$_2$O$_3$. The carrier is further prepared by drying the α-Al$_2$O$_3$ at 100° C. to remove any moisture.

Experimental Example 1

Figure 2:
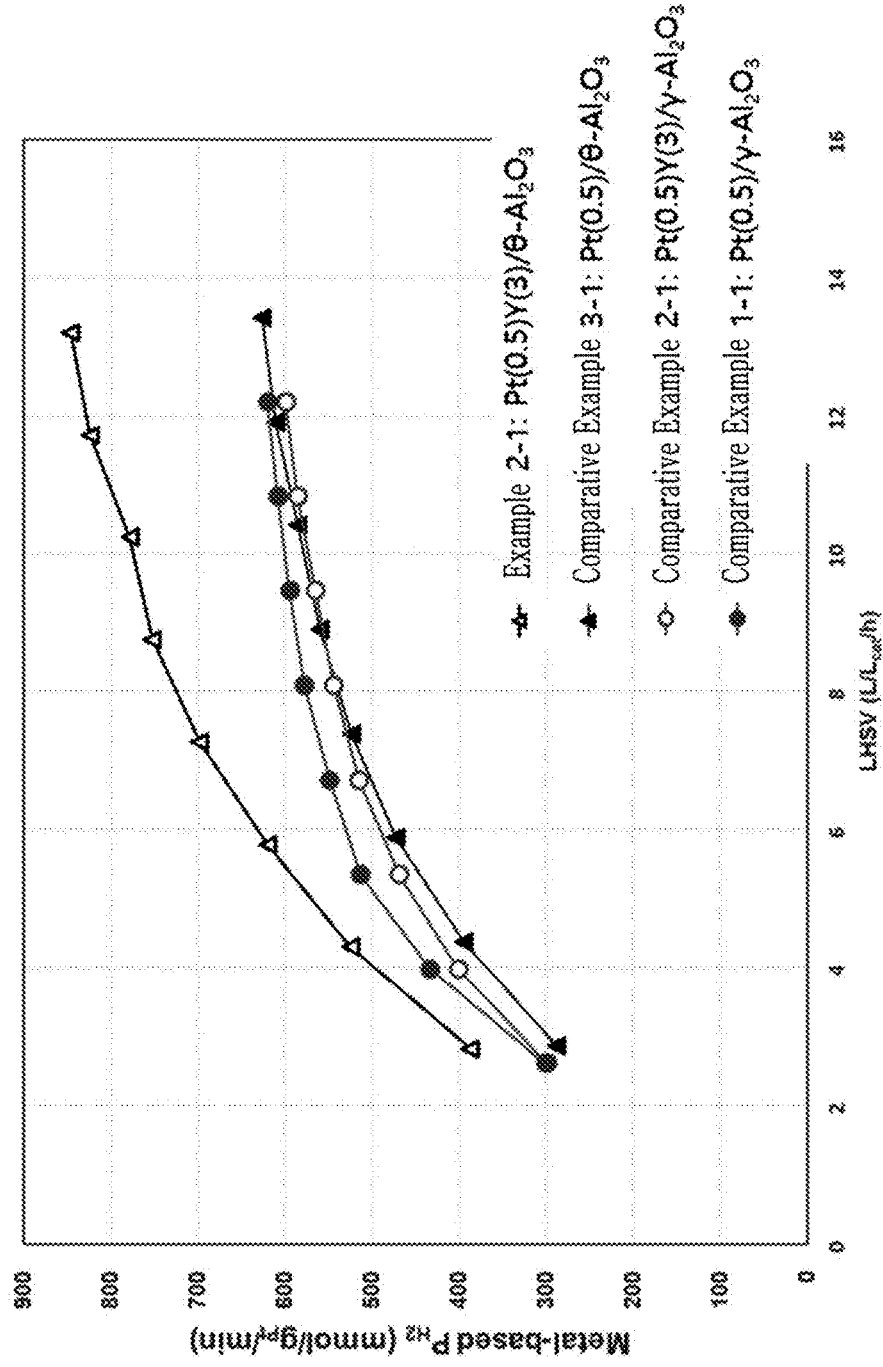
FIG. 2 is a graph showing the results of the dehydrogenation reaction using the catalysts prepared in Example 2-1, Comparative Example 1-1, Comparative Example 2-1, and Comparative Example 3-1.

The catalysts according to Example 2-1 and Comparative Examples 1-1, 2-1, and 3-1 are respectively used for a dehydrogenation reaction, and the results are shown in FIG. 2.

The dehydrogenation reaction is performed by using methylcyclohexane (MCH) as chemical hydride (LOHC), LHSV ranging from 2.0 ml/mlcat/h to 14.0 ml/mlcat/h, $H_2$/LOHC of 0.03 mol/mol at a reaction temperature of 320° C. under a reaction pressure of 1 bar through 8 steps for reaction time of 80 minutes, wherein a reduction proceeded under conditions of 400° C. and 2 hours.

Referring to FIG. 2, when a hydrogen conversion rate is measured by changing $\gamma$-$Al_2O_3$ to $\theta$-$Al_2O_3$ through a heat treatment to synthesize a Pt(0.5)/$\theta$-$Al_2O_3$ catalyst, the generated hydrogen amount is a little reduced.

On the other hand, when yttrium (Y) is further included as an auxiliary metal, performance is not improved in the $\gamma$-$Al_2O_3$ carrier. However, although the $\theta$-$Al_2O_3$ carrier had a platinum content of 0.5 wt %, the generated hydrogen amount is significantly increased. In other words, when LHSV is 12, the hydrogen conversion rate is about 51%, which exhibited similar performance to that of a conventional Pt(3)/$\gamma$-$Al_2O_3$ catalyst having a platinum content of 3 wt %.

Experimental Example 2

Figure 3:
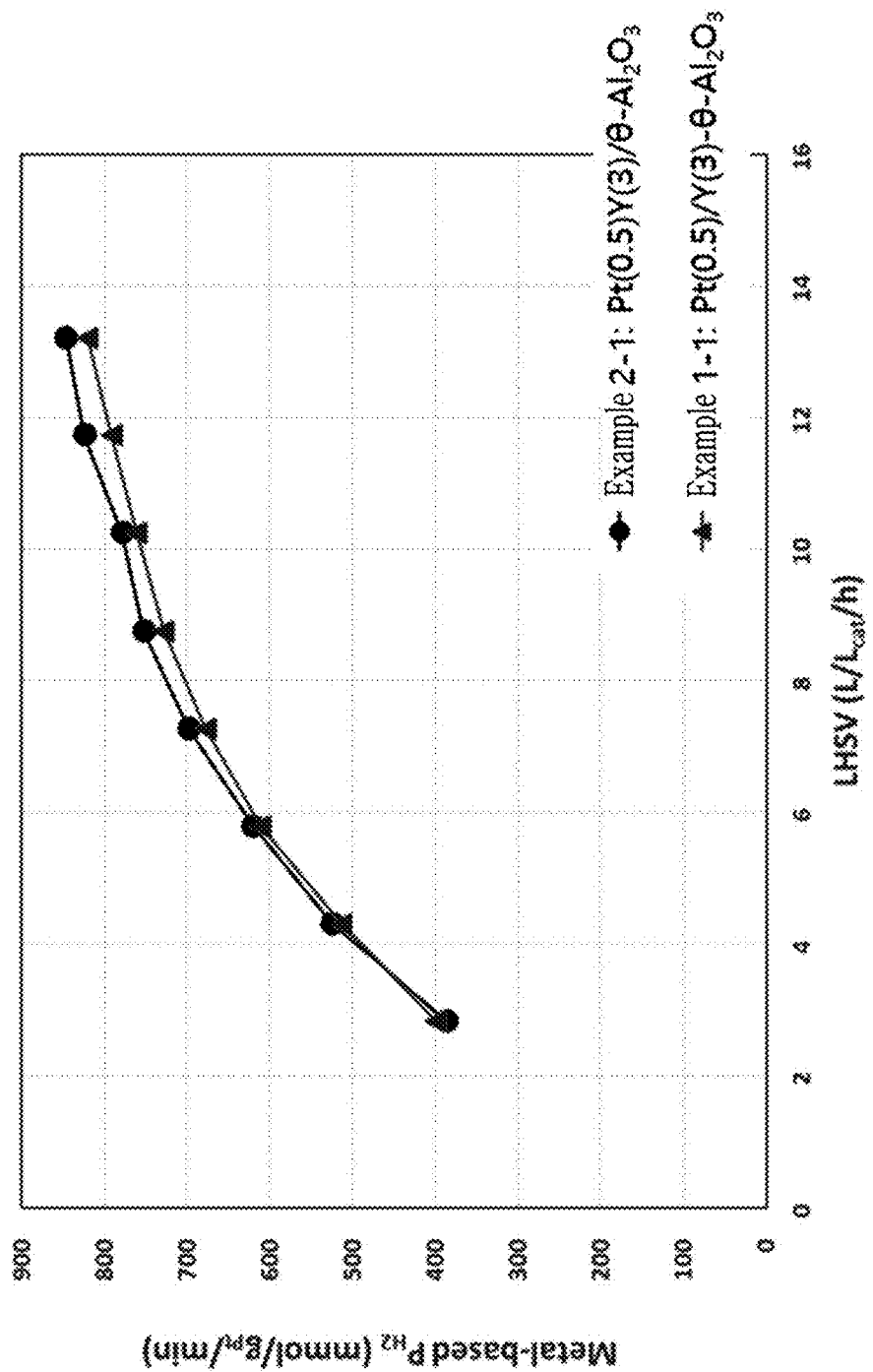
FIG. 3 is a graph showing the results of the dehydrogenation reaction using the catalysts prepared in Example 1-1 and Example 2-1.

The catalysts of Examples 1-1 and 2-1 are used to carry out a dehydrogenation reaction, and the results are shown in FIG. 3. The dehydrogenation reaction is carried out under the same conditions as in Experimental Example 1.

Referring to FIG. 3, as a result of preparing catalyst by using sequential impregnation and co-impregnation, when $\theta$-$Al_2O_3$ is first prepared, and then platinum and yttrium are supported thereon, or when $\theta$-$Al_2O_3$ is prepared while yttrium is simultaneously supported, all similar performances are obtained.

Accordingly, both of the methods all turned out to provide excellent catalysts, wherein yttrium active sites on the surface of the catalysts are judged to have influences on the platinum.

Experimental Example 3

Figure 4:
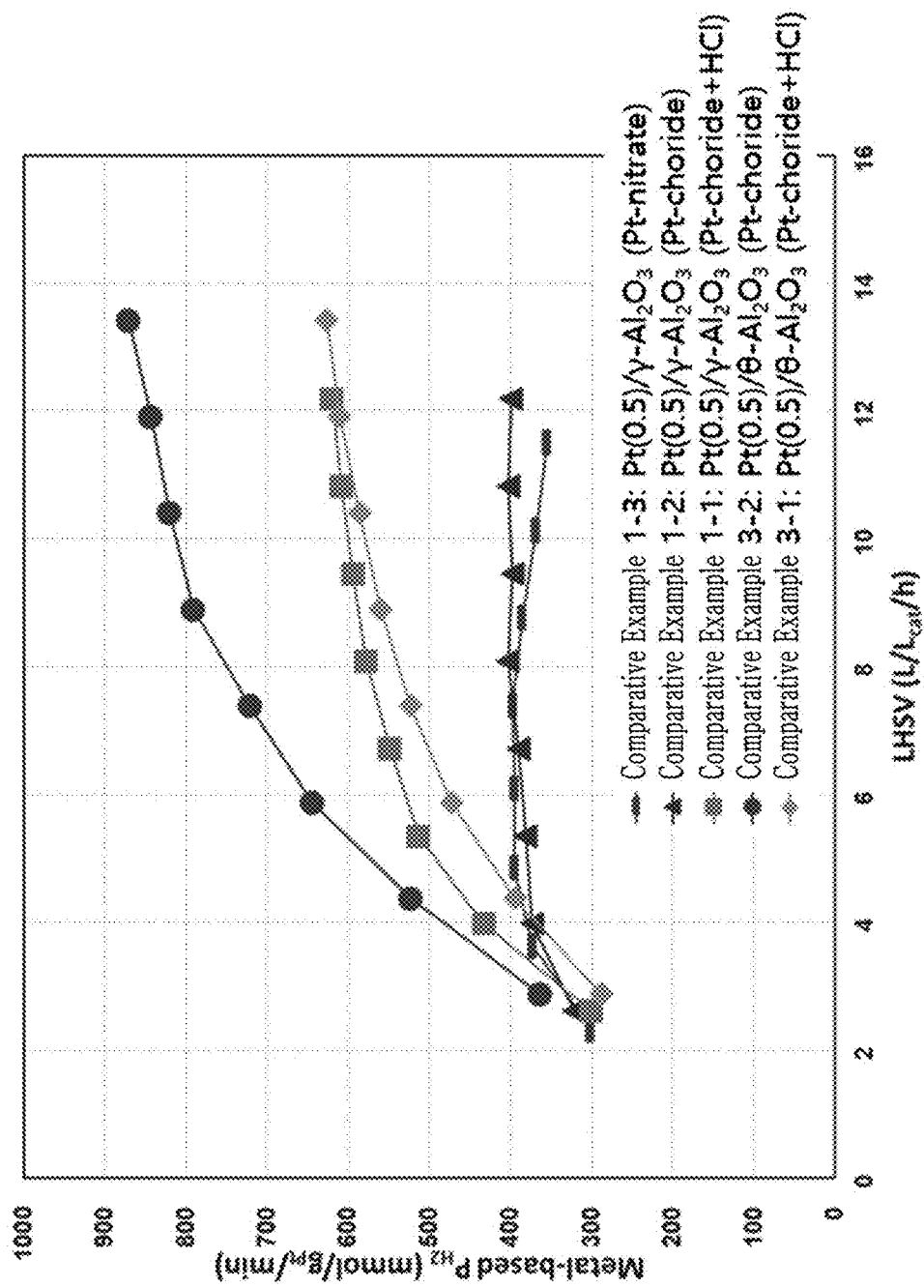
FIG. 4 is a graph showing the results of the dehydrogenation reaction using the catalysts prepared in Comparative Example 1-1 to Comparative Example 1-3 and Comparative Example 3-1 to Comparative Example 3-2.
Figure 5:
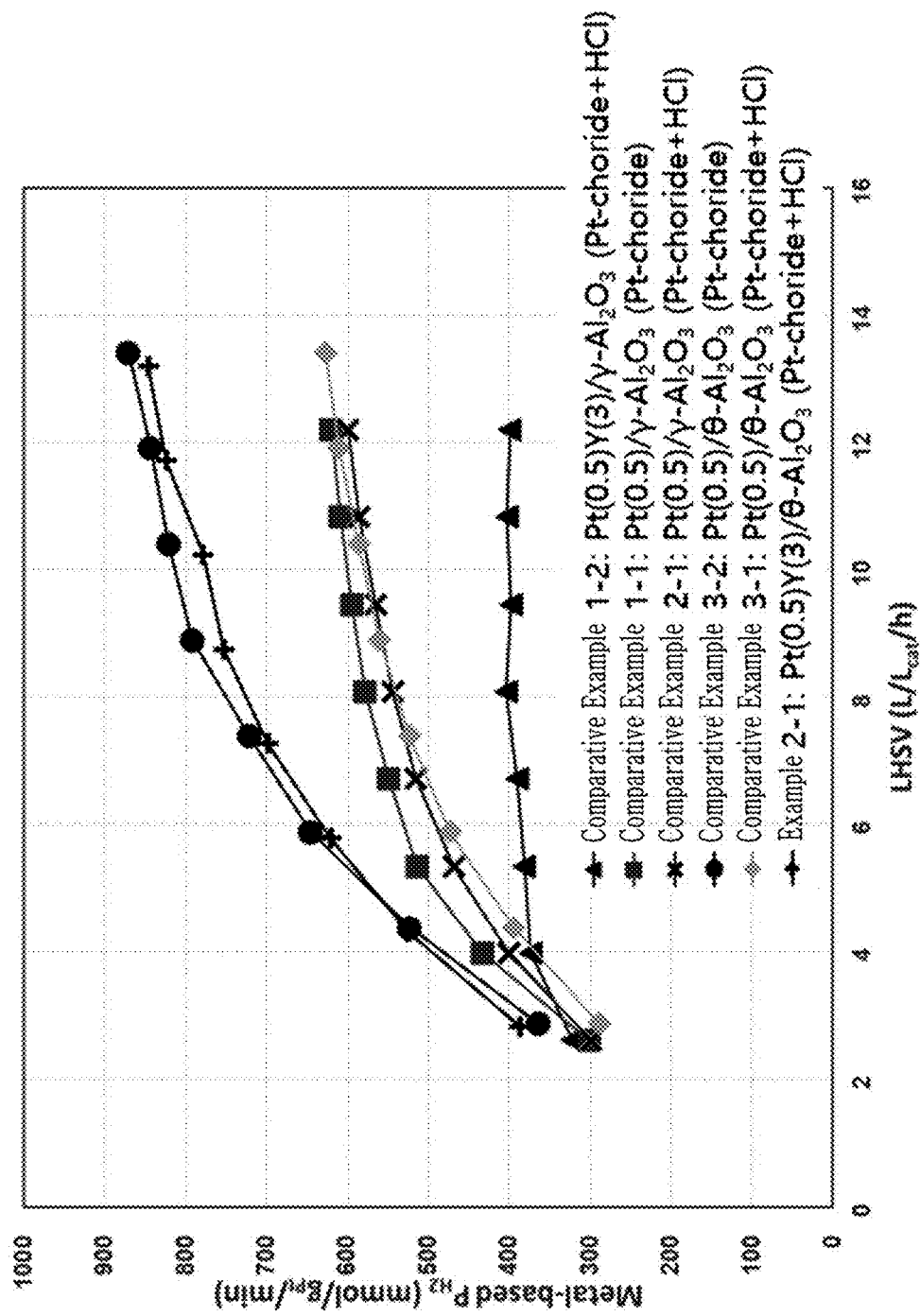
FIG. 5 is a graph showing the results of the dehydrogenation reactions using the catalysts prepared in Example 2-1, Comparative Example 1-1, Comparative Example 1-2, Comparative Example 2-1, Comparative Example 3-1, and Comparative Example 3-2.

The catalysts, according to Comparative Examples 1-1 to 1-3 and 3-1 to 3-2, are used to carry out a dehydrogenation reaction, and the results are shown in FIG. 4. In addition, the catalysts of Example 2-1 and Comparative Examples 1-1, 1-2, 2-1, 3-1, and 3-2 are used to carry out the dehydrogenation reaction, and the results are shown in FIG. 5. The dehydrogenation reaction is carried out under the same conditions as in Experimental Example 1.

Referring to FIG. 4 and FIG. 5, the catalysts used nitrate-based and chloride-based platinum precursors and thus had no significant influence on the hydrogen-generating performance.

In addition, $\gamma$-$Al_2O_3$ prepared by additionally adding a platinum chloride precursor and hydrochloric acid (HCl) exhibited greatly (e.g., significantly) increased performance, and $\theta$-$Al_2O_3$ prepared by adding no hydrochloric acid unlike $\gamma$-$Al_2O_3$ exhibited excellent performance.

In addition, when yttrium is added to the two carriers, the $\gamma$-$Al_2O_3$ carrier exhibits little decrease in the performance improvement, and the $\theta$-$Al_2O_3$ carrier exhibits greatly improved performance.

In other words, the performance of $\theta$-$Al_2O_3$, when hydrochloric acid is added thereto, deteriorates, but when yttrium is added thereto, the performance increases again.

Experimental Example 4

Figure 6:
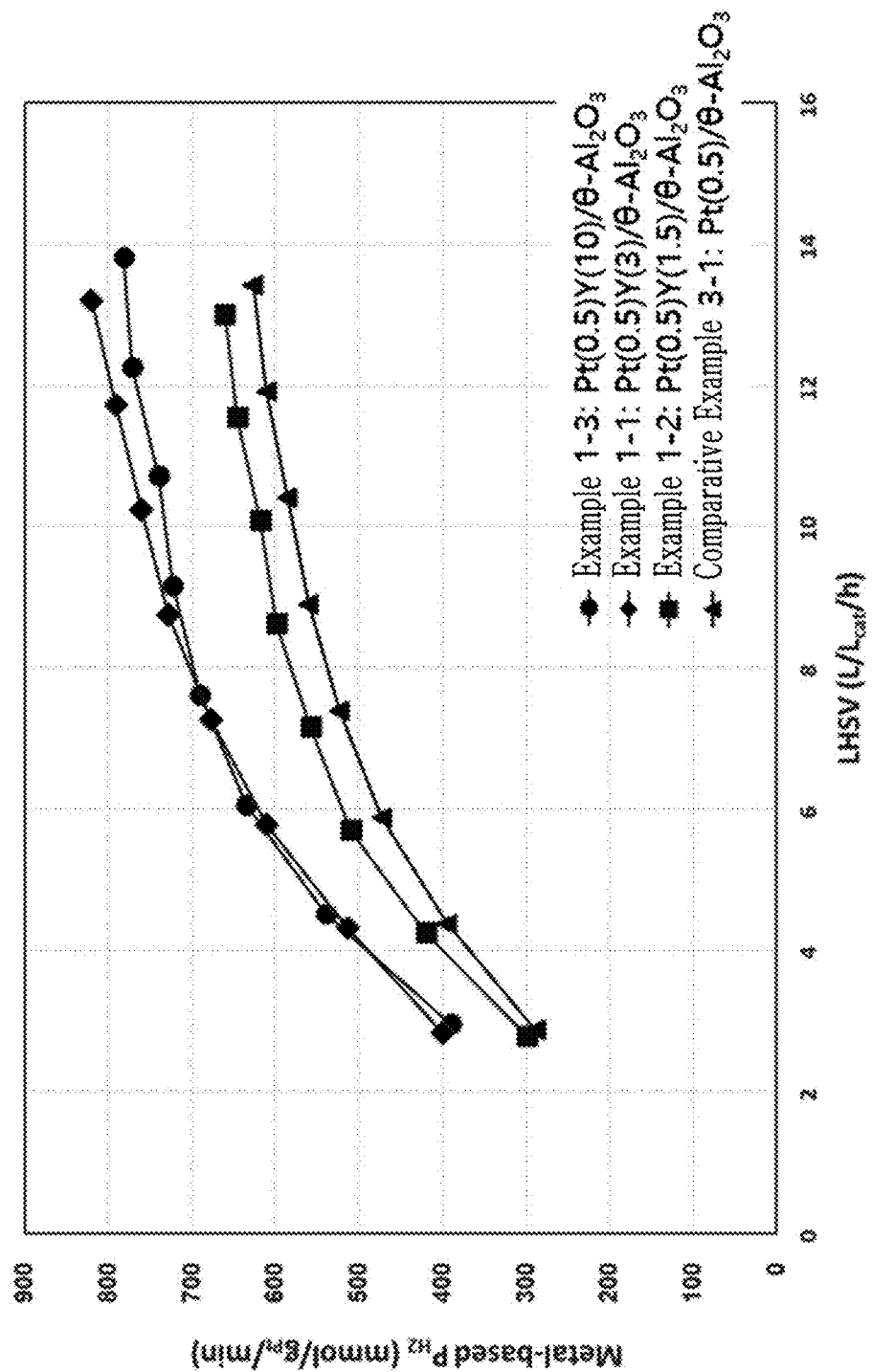
FIG. 6 is a graph showing the results of the dehydrogenation reaction using the catalysts prepared in Example 1-1 to Example 1-3 and Comparative Example 3-1.

The catalysts of Examples 1-1 to 1-3 and Comparative Example 3-1 are used to carry out a dehydrogenation reaction, and the results are shown in FIG. 6. The dehydrogenation reaction is carried out under the same conditions as in Experimental Example 1.

Referring to FIG. 6, under the same platinum content, when the yttrium content is 3 wt % or more, excellent performance is obtained, but when the yttrium content is less than 3 wt %, the performance is slightly increased. In addition, as the platinum content increased, an optimal content range of the yttrium is judged to be changed.

Experimental Example 5

Figure 7:
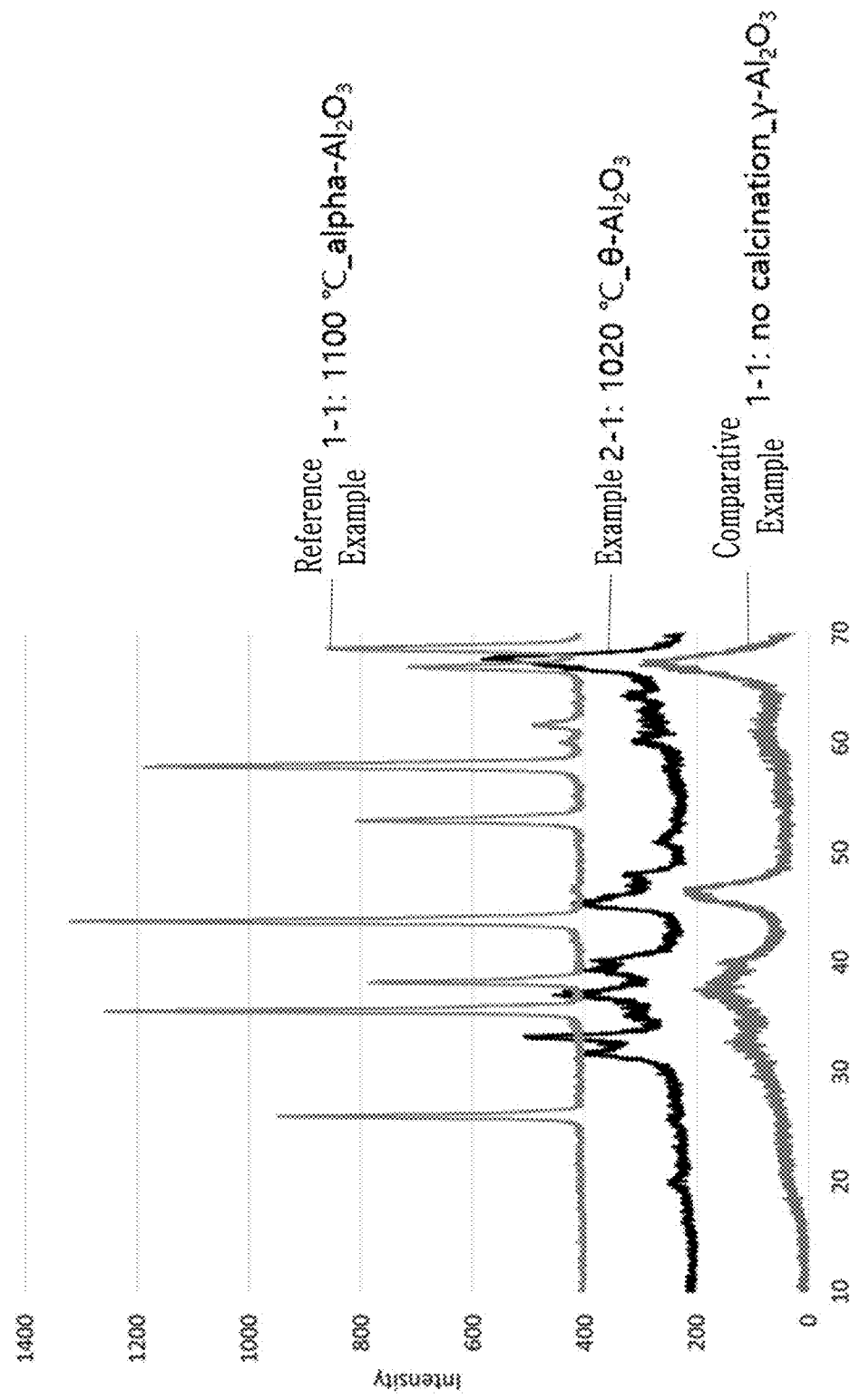
FIG. 7 is a graph showing the results of analyzing the carriers prepared in Example 2-1, Comparative Example 1-1, and Reference Example 1-1 by X-ray diffraction analysis (XRD)

The $Al_2O_3$ carriers prepared or used in Example 2-1, Comparative Example 1-1, and Reference Example 1-1 are analyzed by an X-ray diffraction analysis (XRD), and the results are shown in FIG. 7.

Referring to the XRD results shown in FIG. 7, when heat-treated at 1020° C., the carriers mostly turned out to include $\theta$-$Al_2O_3$.

Experimental Example 6

Figure 8:
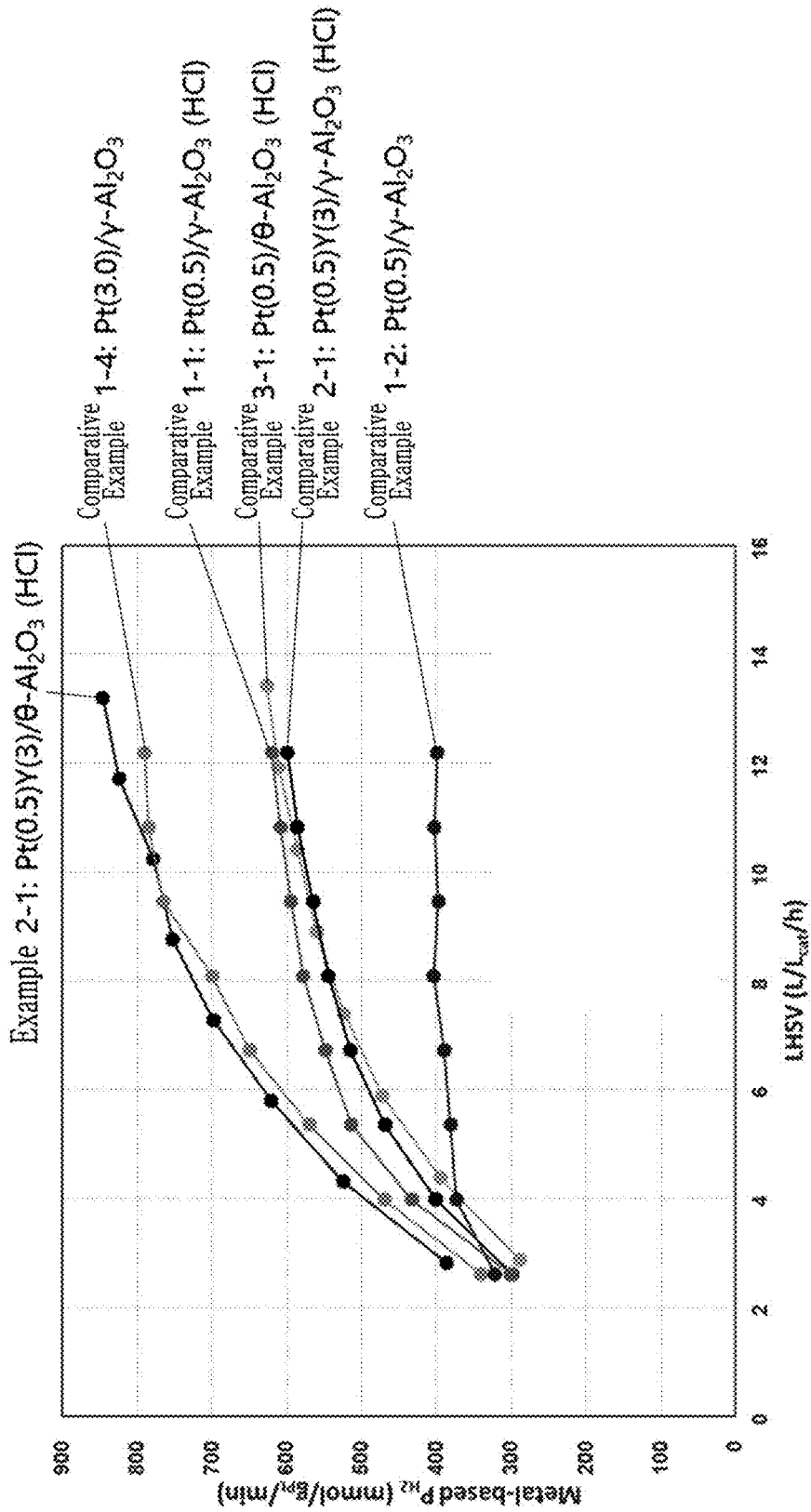
FIG. 8 is a graph showing the results of the dehydrogenation reaction using the catalysts prepared in Example 2-1, Comparative Example 1-1, Comparative Example 1-2, Comparative Example 1-4, Comparative Example 2-1, and Comparative Example 3-1.

The catalysts of Example 2-1 and Comparative Examples 1-1, 1-2, 1-4, 2-1, and 3-1 are used to carry out a dehydrogenation reaction, and the results are shown in FIG. 8. The dehydrogenation reaction is carried out under the same conditions as in Experimental Example 1.

Referring to FIG. 8, Example 2-1 had a platinum content of 0.5 wt % but exhibited similar performance to that of the catalyst having a platinum content of 3 wt %. Accordingly, compared with a conventional platinum catalyst, Example 2-1 reduced a platinum content by ⅙ and also, reduced catalyst usage and volume by increasing space velocity.

Experimental Example 7

Figure 9:
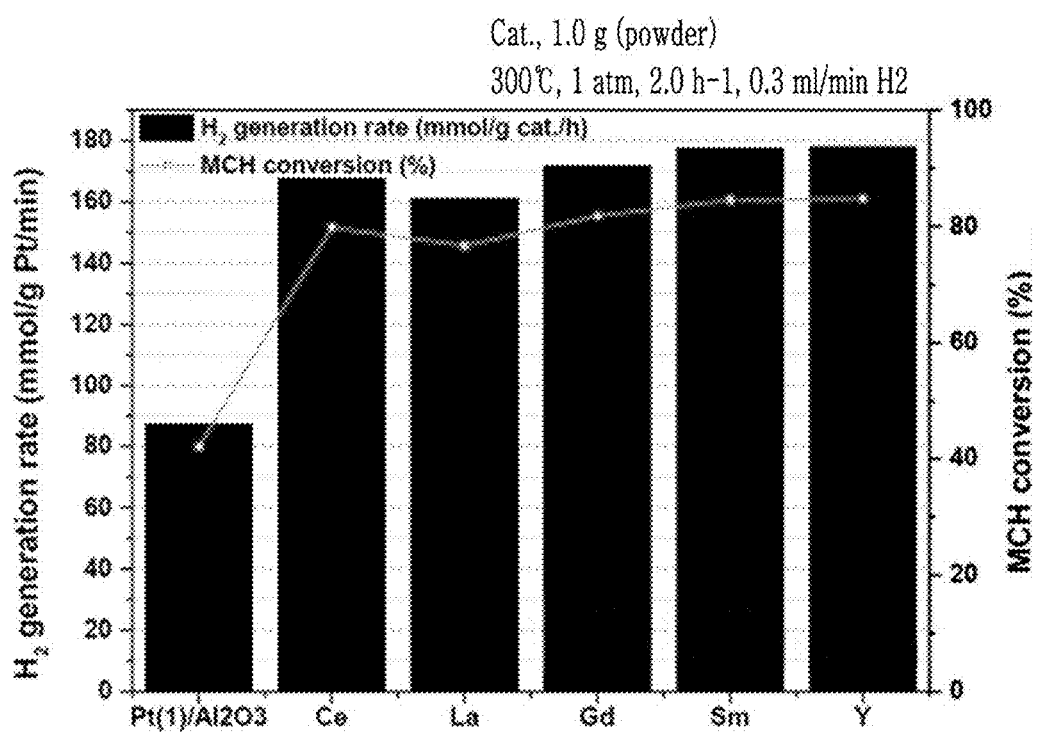
FIG. 9 is a graph showing results of dehydrogenation reactions according to changing the type of auxiliary metal.

FIG. 9 shows the results of the dehydrogenation reactions by changing types of auxiliary metal in the Pt(1)/$\theta$-$Al_2O_3$ catalyst.

Referring to FIG. 9, as Ce, La, Gd, Sm, and Y are added to the $\theta$-$Al_2O_3$ catalyst, hydrogen-generating performance is increased, and particularly, when Y is added thereto, the most excellent result is obtained.

While this disclosure has been described in connection with what is presently considered to be practical embodiments, it is to be understood that the disclosure is not limited to the disclosed embodiments. However, on the contrary, the disclosure is intended to cover various modifications and equivalent arrangements included within the spirit and scope of the appended claims.

DESCRIPTION OF SYMBOLS

110: reactant tank
120: vaporizer
210: dehydrogenation reactor
220: product tank
230: heat source
300: hydrogen separator
400: buffer tank
500: fuel cell stack
610, 620: pump

What is claimed is:
1. A catalyst for a dehydrogenation reaction, comprising:
a carrier including $Al_2O_3$ having a theta ($\theta$) phase and $Al_2O_3$ having a gamma ($\gamma$) phase, an active metal supported on the carrier and including a noble metal, and an auxiliary metal supported on the carrier and different from the active metal, wherein the auxiliary metal includes yttrium (Y), and wherein the carrier includes the $Al_2O_3$ having the theta ($\theta$) phase in an amount greater than or equal to about 90 wt % based on a total weight of the $Al_2O_3$ having the theta ($\theta$) phase and the $Al_2O_3$ having the gamma ($\gamma$) phase.

2. The catalyst of claim 1, wherein
the carrier further includes $TiO_2$, $SiO_2$, $ZrO_2$, $SnO_2$, $Ta_2O_5$, $HfO_2$, $La_2O_3$, $V_2O_5$, $CeO_2$, $Fe_2O_3$, $Cr_2O_3$, $MoO_3$, ZnO, MgO, $WO_3$, or a combination thereof.

3. The catalyst of claim 1, wherein
the active metal includes platinum (Pt), palladium (Pd), rhodium (Rh), ruthenium (Ru), iridium (Ir), osmium (Os), or a mixture thereof.

4. The catalyst of claim 1, wherein
the catalyst includes the active metal and the auxiliary metal in an amount of about 0.1 wt % to about 21 wt % based on a total weight of the catalyst.

5. The catalyst of claim 1, wherein
the catalyst includes the active metal in an amount of about 0.1 wt % to about 5 wt % based on a total weight of the catalyst.

6. The catalyst of claim 1, wherein
the catalyst includes the auxiliary metal in an amount of about 1 wt % to about 20 wt % based on a total weight of the catalyst.

7. The catalyst of claim 1, wherein
the auxiliary metal further includes cerium (Ce), samarium (Sm), gadolinium (Gd), or a mixture thereof.

8. A method of manufacturing the catalyst according to claim 1 for the dehydrogenation reaction, the method comprising:

heat-treating $Al_2O_3$ having a gamma ($\gamma$) phase to prepare $Al_2O_3$ having a theta ($\theta$) phase; and supporting an active metal including a noble metal and an auxiliary metal different from the active metal on a carrier, wherein the auxiliary metal includes yttrium (Y), wherein the carrier including the $Al_2O_3$ having the theta ($\theta$) phase and the $Al_2O_3$ having the gamma ($\gamma$) phase, and wherein the carrier includes the $Al_2O_3$ having the theta ($\theta$) phase in an amount greater than or equal to about 90 wt % based on a total weight of the $Al_2O_3$ having the theta ($\theta$) phase and the $Al_2O_3$ having the gamma ($\gamma$) phase.

9. The method of claim 8, wherein
the heat-treating of $Al_2O_3$ having a gamma (Y) phase is performed at a temperature increase rate of about 1° C./min to about 10° C./min, at greater than or equal to about 500° C. and less than about 1200° C. for about 1 to 5 hours.

10. The method of claim 8, wherein
the supporting is accomplished by:
mixing a solution including a precursor of the auxiliary metal with the carrier, followed by drying and sintering the mixture to prepare a carrier on which an auxiliary metal is supported, and
mixing a solution including a precursor of the active metal with the carrier on which the auxiliary metal is supported, followed by sintering to support the active metal on the carrier on which the auxiliary metal is supported.

11. The method of claim 10, wherein
the solution including a precursor of the active metal or the solution including the precursor of the auxiliary metal and the carrier are mixed at about 20° C. to about 60° C. for about 2 hours or more.

12. The method of claim 10, further comprising:
adding hydrochloric acid (HCl) to the solution including the precursor of the active metal.

13. The method of claim 12, wherein
the hydrochloric acid is included in an amount of about 1 wt % to about 10 wt % based on a total weight of a solvent of the solution including the precursor of the active metal.

14. The method of claim 10, wherein
the sintering is performed at a temperature increase rate of about 1° C./min to about 10° C./min at about 400° C. to about 500° C. for about 3 to 5 hours.

15. The method of claim 10, wherein:
when sintering to prepare a carrier on which an auxiliary metal is supported, heat-treating of $Al_2O_3$ having a gamma ($\gamma$) phase is also performed, and
the sintering is performed at greater than or equal to about 400° C. and less than about 1100° C. for about 3 to 5 hours.

16. The method of claim 8, wherein
the supporting is accomplished by:
mixing a solution including a precursor of the auxiliary metal with a carrier, followed by drying the mixture to manufacture a carrier treated with an auxiliary metal, and
mixing a solution including a precursor of the active metal with a carrier treated with an auxiliary metal, followed by sintering the mixture to support the active metal and the auxiliary metal on the carrier.

17. The method of claim 8, wherein
the supporting is accomplished by:
mixing a solution including a precursor of the active metal and a solution including a precursor of the auxiliary metal with a carrier, followed by sintering the mixture to support the active metal and the auxiliary metal on the carrier.

18. The method of claim 8, wherein
when supported, the carrier includes $Al_2O_3$ having a theta ($\theta$) phase.

19. A hydrogen production method, comprising
dehydrogenating a chemical hydride in presence of the catalyst according to claim 1 to produce hydrogen,
wherein the catalyst according to claim 1 is manufactured by:
heat-treating $Al_2O_3$ having a gamma ($\gamma$) phase to prepare $Al_2O_3$ having a theta ($\theta$) phase; and
supporting an active metal including a noble metal and an auxiliary metal different from the active metal on a carrier, and
wherein the auxiliary metal includes yttrium (Y),
wherein the carrier including the $Al_2O_3$ having the theta ($\theta$) phase and the $Al_2O_3$ having the gamma ($\gamma$) phase, and
wherein the carrier includes the $Al_2O_3$ having the theta ($\theta$) phase in an amount greater than or equal to about 90 wt % based on a total weight of the $Al_2O_3$ having the theta ($\theta$) phase and the $Al_2O_3$ having the gamma ($\gamma$) phase.

\* \* \* \* \*